3,005,677
OXIDATION DYEINGS AND PRINTS

Konrad Weis and Helmut Kleiner, Koln-Stammheim, and Otto Bayer, Leverkusen, Germany, assignors to Farbenfabriken Bayer Aktiengesellschaft, Leverkusen, Germany, a corporation of Germany
No Drawing. Filed Oct. 29, 1959, Ser. No. 849,431
Claims priority, application Germany Mar. 15, 1956
12 Claims. (Cl. 8—32)

The present invention relates to the manufacture of oxidation dyeings; more particularly it relates to the preparation of oxidation dyeings by using as oxidizable dyestuff-forming substances N-glycosides or N-glycamines of aromatic amines.

It is known to dye materials of vegetable or animal origin by printing or padding with salts of aromatic amines, for example aniline, p- or m-phenylenediamine and aminodiphenylamine followed by oxidation. The disadvantage of this process consists in that the acids liberated by oxidation may damage the fibre; moreover the printing pastes have only a limited stability, and black shades often develop an undesired green tone on storing. In order to obviate these disadvantages, the use of aromatic compounds with one or more sulfaminic acid groups has been proposed. Another process provides for the use of condensation products of aromatic amines with poly-basic acids. In these processes also, non-volatile free acids are formed on the fibre upon oxidation.

In accordance with the invention it has been found that the aforesaid disadvantages can effectively be obviated by using, as oxidizable dyestuff-forming substances, N-glycosides, particularly N-glucosides of aromatic amines having one to two carbocyclic nuclei which may be substituted, or the reduction products of these N-glycosides, i.e. the N-glycamines, especially the N-glucamines, if desired in the presence of polyhydric phenols.

Such glycosides or glycamines are sufficiently stable in printing pastes or padding solutions, especially with the addition of volatile basic compounds such as ammonia; at elevated temperatures they may easily be split into oxidizable amines and the corresponding sugars. Compared with the acids split off in the aforesaid processes, the reformed sugars have the advantage of having a protective action on the fibre as is already known of sugars in the literature. Moreover they cause a slower oxidation of the amines so that these can penetrate more deeply into the fibre prior to the formation of pigment (oxidation).

This delay in the oxidation may, however, lead with some amines within the usual reaction periods and with the use of common oxidation agents to somewhat weaker dyeings or prints than are obtained with amines in the absence of sugars. This delay may be compensated by employing stronger oxidation agents or more rapidly acting oxidation catalysts for example potassium ferrocyanide. It is however expedient in such cases to carry out the oxidation in the presence of polyhydric phenols.

The preparation of the glycosides is effected by known methods by heating stoichiometric amounts of aromatic amines having one to two carbocyclic nuclei and sugars in an alcoholic or aqueous medium with the addition of a catalyst such as ammonium chloride or zinc chloride until a solution is formed, and by subsequent isolating the reaction products by removing the solvents under mild conditions, preferably under reduced pressure. In most cases the glycosides thus obtained are weakly to more intensely brown-colored non-hygroscopic powders.

The preparation of glycamines can be carried out in various ways, for example the aromatic amines can be reacted with for example chlorohydrins of sugar alcohols, for instance of mannitol; it is more advantageous to reduce the N-glycosides of aromatic amines by catalytically activated hydrogen under pressure whereby the intermediate isolation of the glycosides is generally not necessary. In particular, the process is carried out by heating stoichiometric amounts of an aromatic amine of the said structure and an aldehyde or keto-sugar in an aqueous or preferably alcoholic medium with the addition of acid catalysts such as ammonium chloride or zinc chloride until a solution is formed. The solution is then neutralized with small amounts of sodium bicarbonate and hydrogenated after the addition of a catalyst, for example Raney-nickel, under pressure at elevated temperatures until no further hydrogen is absorbed. After removal of the solvent, the glycamines are obtained as solid, mostly dark-colored powders. The N-glucamines are the reduced condensation products of aromatic amines with glucose.

The glycosides or glucamines of the amines chiefly used for the manufacture of oxidation dyeings and printings such as aniline, xylidine, para-phenylenediamine, p-aminophenol, aminodiphenylamine or naphthylenediamine are soluble in water. If the solubility of glycosides or glycamines is not sufficient for practical use, they may be pasted with organic solvents such as ethyl alcohol, polyglycols, glycol ethers or with dispersing agents.

Suitable polyhydric phenols and substitution products thereof which may be added to the printing pastes or dyestuff mixtures are for example pyrocatechol, resorcinol, orcinol, hydroquinone, phloroglucinol, pyrogallol, hydroxyhydroquinone, vicinal, symmetric or asymmetric tetrahydroxybenzene, pentahydroxybenzene as well as hexahydroxybenzene which is obtainable from cyclohexane hexone by reduction. In appropriate compositions, these phenols yield per se only weak dyeings or prints.

The proportions of polyhydric phenols to be added may arbitrarily be chosen, but optimum results are obtained by using at least stoichiometric quantities referred to the amine components.

It is expedient to eliminate the weakly acid character of the polyhydric phenols by the addition of an alkali, for example ammonia, in order to prevent a premature oxidation of the glycosides or glycamines in the printing or padding compositions.

The compounds according to the invention may be used in the textile printing or dyeing by methods usual for the formation of oxidation colors. As oxidizing agent there may be considered for example chlorates, chromates or bichromates, as oxidation catalysts the salts of vanadic or ferro-cyanic acid, as acid splitting compounds ammonium chloride, ammonium sulfate, ammonium oxalate, ammonium thiocyanate. The oxidative development may however also be effected with acid steam. It is also possible to use after-oxidation processes such as the after-treatment with chrome-acetic acid baths. In addition to dyeings in plain colors, multi-colored prints may also be produced by the co-application of other dyestuffs, for example vat dyestuffs.

It is also possible to obtain white or color resists in usual manner by printing basic agents such as zinc oxide. The printing pastes and dye-baths can contain usual auxiliaries such as solvents, wetting or dispersing agents or hygroscopic compounds.

The following examples are given for the purpose of illustrating the invention without, however, limiting it thereto. The parts by weight and the parts by volume stand in the ratio of grams to millilitres.

*Example 1*

A cotton fabric is printed with a printing paste having the following composition:

10 parts by weight of 4-amino-diphenyamine-N-d-glucoside are slowly dissolved while pasting with water in
19 parts by volume of water, and
5 parts by volume of 2 percent ammonia;
3 parts by weight of a polyglycol ether having a molecular weight of 200, and
2 parts by weight of thiodiglycol are added thereto.

The solution is slowly stirred into a thickener containing:

50 parts by weight of tragacanth 65:1000 or starch-tragacanth
5 parts by weight of ammonium chloride
4 parts by weight of sodium chlorate
2 parts by weight of ammonium vanadate 1:100

After the printing, the fabric is steamed in a Mather and Platt ager for 10 minutes and subsequentlly boiled and soaped. A strong black print is obtained.

Instead of using the Mather and Platt ager the print can also be developed with acetic steam. The same good results are obtained when printing fabrics of regenerated cellulose, acetate rayon or of synthetic fibres such as fabrics prepared from polyamides, polyurethanes, polyesters or polyacrylonitrile.

The glucoside used in this example may be obtained as follows:

250 parts by weight of 4-amino-diphenylamine, 275 parts by weight of d-glucose and 1 part by weight of zinc chloride are introduced with stirring into 1000 part by volume of methanol. The mixture is then refluxed for 3 hours thus forming a clear solution. The solvent is distilled off under reduced pressure and the syrup thus obtained dried on a drying plate under vacuum at about 40° C. 469 parts by weight of a weakly brownish powder are thus obtained which readily dissolve in a little water to give a clear solution; when more water is added, the solution becomes turbid and finally clear again on the addition of more water.

*Example 2*

An unbleached cotton fabric is printed with a printing paste having the following composition:

10 parts by weight of the N,N-diglucoside of 4,4'-diamino-diphenylamine
24 parts by volume of water containing 5 parts by volume of 2 percent ammonia
3 parts by weights of a polyglycol ether
2 parts by weight of thiodiglycol
50 parts by weight of tragacanth thickening (65:1000)
5 parts by weight of ammonium chloride
4 parts by weight of sodium chlorate
2 parts by weight of ammonium vanadate (1:100)

After printing, the print is developed with neutral steam for 10 minutes and then soaped and boiled. A full black print is obtained.

The glucoside used in this example may be obtained as follows:

20 parts by weight of 4,4'-diamino-diphenylamine, 40 parts by weight of glucose and 1 part by weight of zinc chloride (which may be replaced by ammonium chloride) are refluxed in 300 parts by volume of methanol for about 5 hours. Upon cooling, a dark syrup separates from the dark liquid. The solvent is poured off and distilled off under reduced pressure, the syrupy residue is combined with the portion previously separated and dried under vacuum at 40° C. 52 parts by weight of a dark powder are thus obtained which readily dissolves in water.

*Example 3*

A cotton fabric is printed with a printing paste having the following composition:

10 parts by weight of the N,N'-diglucoside of p-phenylenediamine
20 parts by volume of water
5 parts by volume of 2 percent ammonia
40 parts by weight of starch-tragacanth thickening (65:1000)
5 parts by weight of ammonium chloride
5 parts by weight of potassium bichromate
2 parts by weight of ammonium vanadate (1:100)
13 parts by volume of water The fabric is steamed neutral for 45 minutes, soaped and boiled. A black-brown print is obtained.

The diglucoside used in this example may be prepared as follows:

21.6 parts by weight of p-phenylene-diamine, 75 parts by weight of glucose and 1 part by weight of zinc chloride are boiled under reflux in 300 parts by volume of methanol for 4 hours. Upon cooling a dark syrup separates which is combined with the portion remaining after distillation of the solvent under reduced pressure, and dried under vacuum at 40° C. 74 parts by weight of a black powder are thus obtained which readily dissolves in water.

*Example 4*

A cotton fabric is printed with a printing paste of the following composition:

10 parts by weight of the N-glucoside of 4-amino-4'-methoxy-diphenylamine are dissolved in
20 parts by volume of ethyl alcohol,
5 parts by volume of a polyglycol ether, and
4 parts by volume of thiodiglycol The solution is stirred into:

50 parts by volume of tragacanth thickening (65:1000)
5 parts by weight of ammonium chloride
4 parts by weight of sodium chlorate
2 parts by weight of ammonium vanadate (1:100)

After printing, the fabric is steamed neutral for 10 minutes and soaped with boiling. A full black print is thus obtained.

The glucoside used in this example may be prepared as follows:

21.4 parts by weight of 4-amino-4'-methoxy-diphenylamine, 20 parts by weight of glucose and 1 part by weight of zinc chloride are refluxed in 400 parts by volume of methanol for 4 hours. The solution is filtered off from a small undissolved residue and the filtrate is evaporated to dryness under reduced pressure. A dark brittle powder is thus obtained which dissolves in water with somewhat more difficulty than the N-glucoside of the unsubstituted 4-amino-diphenylamine. If, however, the product thus obtained is first pasted with alcohol, it does not precipitate upon dilution with water.

Example 5

A black dyeing on an unbleached cotton fabric may be obtained in the following manner:

40 parts by weight of tragacanth thickening (65:1000) are stirred in portions with
750 parts by volume of water and treated with
23 parts by weight of sodium chlorate
10 parts by weight of an ammonium vanadate solution (1:100) and
5 parts by weight of 2 percent ammonia.

A solution of:

60 parts by weight of the N-glucoside of 4-amino-diphenylamine in 112 parts by volume of water is then added thereto.

The fabric is padded at a temperature of approximately 50° C. for about 20 minutes, dried and developed with acetic steam. It is then rinsed, soaped and boiled.

Example 6

20 grams of wool skein are turned in a bath containing:
2 parts by weight of the N-glucoside of 4-amino-diphenylamine and
2 parts by weight of sodium sulfate in 500 parts by volume of water at water bath temperature for 20 minutes.
1 part by weight of sodium chlorate,
2 parts by weight of glacial acetic acid, and
1 part by volume of ammonium vanadate solution (1:100) are added thereto and dyeing is continued for a further 40 minutes. The skein is then squeezed out, rinsed and worked up. A deep black dyeing is thus obtained.

Example 7

A printing paste of the following composition is printed onto a cotton fabric:

10 parts by weight of the N-lactoside of 4-aminodiphenylamine are dissolved in a mixture of
20 parts by volume of water and
20 parts by volume of methanol;
5 parts by volume of 2 percent ammonia
3 parts by weight of a polyglycol ether, and
2 parts by weight of thiodiglycol are added thereto.

The solution is then slowly introduced into a thickening containing:

50 parts by weight of tragacanth (65:1000)
5 parts by weight of ammonium chloride
4 parts by weight of sodium chlorate and
2 parts by weight of ammonium vanadate (1:100)

After printing, the fabric is steamed in a Mather and Platt ager for 10 minutes, rinsed, boiled and soaped. A full black print is thus obtained.

The lactoside used in this example may be prepared in the following manner:

18 parts by weight of 4-aminodiphenylamine are boiled with 37.8 parts by weight of lactose with the addition of a small grain of zinc chloride in 400 parts by volume of methanol for 24 hours. The reaction product which precipitates is isolated and combined with the distillation residue of the solvent. 48 parts by weight of lactoside are thus obtained which easily dissolves in 50 percent methanol.

Example 8

A printing paste prepared as follows is printed onto a cotton fabric. It is then developed with neutral steam for 10 minutes, rinsed and soaped and boiled. A deep black shade is thus obtained.

Preparation of the printing paste:

10 parts by weight of the N-fructoside of 4-amino-diphenylamine are dissolved in
20 parts by volume of methanol;
3 parts by weight of a polyglycol ether
1 part by weight of thiodiglycol, and
5 parts by volume of 2 percent ammonia are added thereto.

The solution is slowly stirred into a thickening containing:

50 parts by weight of tragacanth (65:1000)
5 parts by weight of ammonium chloride
4 parts by weight of sodium chlorate and
2 parts by weight of ammonium vanadate (1:100)

The N-fructoside of 4-amino-diphenylamine used in this example may be prepared in the following manner:

18 parts by weight of 4-amino-diphenylamine and 19 parts by weight of fructose are refluxed with the addition of a zinc chloride crystal for 3 hours. The solution is then evaporated to dryness under reduced pressure and the residue is dried at a mild temperature. 31 parts by weight of the N-fructoside are thus obtained which readily dissolves in alcohols and with somewhat more difficulty in water.

Example 9

A cotton fabric is printed with a printing paste of the following composition:

10 parts by weight of N-(4-diphenylamino)-glucamine are dissolved in
15 parts by volume of hot water with the addition of
5 parts by weight of thiodiglycol and stirred into a mixture of
60 parts by weight of tragacanth (65:1000) or starch-tragacanth
5 parts by weight of ammonium chloride
4 parts by weight of sodium chlorate and
1 part by weight of a 1 percent ammonium vanadate solution After printing, the fabric is steamed in a Mather and Platt ager for 10 minutes, soaped and boiled. A deep black print is thus obtained. Instead of in the Mather and Platt ager the print may also be developed with acetic steam. Good results are also obtained when printing regenerated cellulose, acetate rayon or synthetic fibres such as fabrics prepared from polyamides, polyurethanes, polyesters or polyacrylonitrile.

The glucamine used in this example may be obtained for example in the following manner:

Stoichiometric amounts of p-aminodiphenylamine and glucose are boiled with twice the amount of methanol with the addition of catalytic amounts of zinc chloride for 1 hour. The hot solution is stirred with a little sodium bicarbonate for 10 minutes until neutral and, after the addition of Raney-nickel, hydrogenated hot under pressure. The catalyst is then removed and the solvent evaporated under vacuum. The glucamine remains as a solid dark mass.

Example 10

A cotton fabric is printed with a printing paste of the following composition:

10 parts by weight of N-(3-hydroxyphenyl)-glucamine are dissolved in
15 parts by weight of hot water with the addition of
5 parts by weight of thiodiglycol and stirred hot into a mixture of
60 parts by weight of tragacanth (65:1000) or starch-tragacanth
5 parts by weight of ammonium chloride
4 parts by weight of sodium chlorate and
1 part by weight of a 1 percent ammonium vanadate solution After printing, the fabric is developed by steaming in a Mather and Platt ager for 10 minutes and then soaped and boiled. A brown print is thus obtained. Instead of in the Mather and Platt ager the print may also be developed with acetic steam. Good results are also obtained when printing regenerated cellulose, acetate rayon or synthetic fibres such as fabrics prepared from polyamides, polyesters or polyacrylonitrile.

The glucamine used in this example may be obtained according to the method described in Example 1 by the reaction of m-aminophenol with glucose and subsequent reduction.

*Example 11*

A printing paste consisting of:

10 parts by weight of the N,N'-diglucoside of m-phenylene-diamine
24.5 parts by volume of water
2.0 parts by volume of 25 percent ammonia
50 parts by weight of starch-tragacanth thickening
5.0 parts by weight of ammonium chloride
4.0 parts by weight of sodium chlorate
2.0 parts by weight of ammonium vanadate solution (1:100) and
2.5 parts by weight of resorcinol is printed on a cotton fabric. It is then developed in neutral steam for 10 minutes, soaped and boiled. A deep brown print is thus obtained which is markedly fuller than a control print without resorcinol. It is also possible to develop with acetic steam instead of neutral steam.

Fabrics of regenerated acetate rayon or synthetic fibres such as fabrics prepared from polyamides, polyesters, or polyacrylonitrile may be dyed in the same manner.

The diglucoside used in this example may be obtained by boiling 1 mol of m-phenylenediamine with 2 mols of glucose in methanol with the addition of zinc chloride for a short time and then carefully steaming to dryness.

*Example 12*

A printing paste consisting of:

10 parts by weight of the N,N'-diglucoside of p-phenylene-diamine
24.0 parts by volume of water
2.0 parts by volume of 25 percent ammonia
50.0 parts by weight of starch-tragacanth-thickening
5.0 parts by weight of ammonium chloride
4.0 parts by weight of sodium chlorate
2.0 parts by weight of ammonium vanadate solution (1:100) and
3.0 parts by weight of pyrogallol is printed on a cotton fabric. It is then steamed in a Mather and Platt ager for 10 minutes, soaped and boiled. A full brown print is thus obtained which is markedly more intense than a control print without pyrogallol. Prints obtained on regenerated cellulose are still stronger.

*Example 13*

A printing paste consisting of:

10 parts by weight of the N-lactoside of 4-aminodiphenylamine dissolved in a mixture of 20 parts by volume of water and 20 parts by volume of methanol
1.8 parts by volume of 25 percent ammonia
2 parts by weight of a polyglycol ether
2 parts by weight of thiodiglycol
50 parts by weight of starch tragacanth thickening (1:100)
5 parts by weight of ammonium chloride
4 parts by weight of sodium chlorate
2 parts by weight of ammonium vanadate solution (1:100) and
3.2 parts by weight of pyrocatechol is printed on a cotton fabric. After printing it is steamed for 10 minutes and then soaped and boiled. A full black print is thus obtained which is stronger than a control print without pyrocatechol.

*Example 14*

10 parts by weight of N-(4-diphenylamino)-glucamine, formed by reduction of the corresponding N-(4-diphenylamino)-glucoside, are dissolved in
21.8 parts by volume of hot water with the addition of
5 parts by weight of thiodiglycol and stirred hot into a mixture of
50 parts by weight of starch-tragacanth-thickening
5 parts by weight of ammonium chloride
4 parts by weight of sodium chlorate
1 part by weight of ammonium vanadate solution (1:100) and
3.2 parts by weight of hydroquinone This printing paste is printed on a cotton fabric. After printing it is steamed, soaped and boiled. A full black print is thus obtained which is fuller than a control print without hydroquinone.

*Example 15*

A cotton fabric is printed with a printing paste having the following composition:

10 parts by weight of 1,5-diamino-naphthalene-N,N'-diglucoside are slowly dissolved while pasting with water in
19 parts by volume of water and
5 parts by volume of 2 percent ammonia;
3 parts by weight of a polyglycol ether having a molecular weight of 200 and
2 parts by weight of thiodigylcol are added thereto.

The solution is slowly stirred into a thickener containing:

50 parts by weight of tragacanth 65:1000 or starch-tragacanth,
5 parts by weight of ammonium chloride
4 parts by weight of sodium chlorate
2 parts by weight of ammonium vanadate 1:100
2 parts by weight of ammonium vanadate 1:100

After the printing, the fabric is steamed in a Mather and Platt ager for 10 minutes and subsequently boiled and soaped. A strong black print is obtained.

Instead of using the Mather and Platt ager the print can also be developed with acetic steam. The same good results are obtained when printing fabrics of regenerated cellulose or acetate rayon or of synthetic fibres such as fabrics prepared from polyamides, polyurethanes, polyesters or polyacrylonitrile.

The glucoside used in this example may be obtained as follows:

A mixture of 158 parts by weight of 1,5-diamino-naphthalene, 360 parts by weight of glucose and 0.5 part by weight of zinc chloride in 500 parts by volume of methanol is refluxed for 2 to 3 hours, a solution being formed. Then the solvent is distilled off under reduced pressure and the remaining syrup is dried on a drying plate under vacuum at 40–50° C. A weakly colored powder is obtained in quantitative yield which easily forms clear solutions with water.

This application is a continuation-in-part application of our copending application Serial No. 642,354, filed February 26, 1957, now abandoned.

We claim:

1. In the process for preparing oxidation dyeings and prints the improvement which comprises using as oxidizable dyestuff-forming substance at least one compound selected from the group consisting of N-glycosides and N-glycamines of aromatic amines having one to two carbocyclic nuclei.

2. In the process for preparing oxidation dyeings and prints the improvement which comprises using as oxidizable dyestuff-forming substance a N-glucoside of an aromatic amine having one to two carbocyclic nuclei.

3. In the process for preparing oxidation dyeings and prints the improvement which comprises using as oxidizable dyestuff-forming substance a N-glucamine of an aromatic amine having one to two carbocyclic nuclei.

4. A process for preparing oxidation dyeings and prints which comprises applying to a material selected from the group consisting of vegetable, animal and synthetic origin a paste which consists in a thickener, at least one compound selected from the group consisting of N-glycosides and N-glycamines of aromatic amines having one to two carbocyclic nuclei, an oxidizing agent, oxidation catalyst, an agent splitting off acid, an alkali, a solvent and a dispersing agent, and developing the dyestuff on said material with steam.

5. A process for preparing oxidation dyeings and prints which comprises applying to a material selected from the group consisting of vegetable, animal and synthetic origin a paste which consists in a thickener, at least one compound selected from the group consisting of N-glycosides and N-glycamines of aromatic amines having one to two carbocyclic nuclei, an oxidizing agent, an oxidation catalyst, an alkali, a solvent and a dispersing agent, and developing the dyestuff on said material with acid steam.

6. Process according to claim 4 which comprises using as oxidizable dyestuff-forming substances N-glucosides of aromatic amines having one to two carbocyclic nuclei.

7. Process according to claim 4 which comprises using as oxidizable dyestuff forming substances N-glucamines of aromatic amines having one to two carbocyclic nuclei.

8. Process according to claim 4 which comprises using as oxidizable dyestuff forming substance 4-amino-diphenylamine-N-d-glucoside.

9. Process according to claim 4 which comprises using as oxidizable dyestuff forming substance 1,4-diamino-benzene-N,N'-di-d-glucoside.

10. Process according to claim 4 which comprises using as oxidizable dyestuff forming substance N-(4-diphenylamino)-glucamine.

11. Process according to claim 4 which comprises using as oxidizable dyestuff forming substance a mixture of 4-amino-diphenylamine-N-d-glucoside and 1,4-diamino-benzene-N,N'-di-d-glucoside.

12. Process according to claim 4 which comprises using as oxidizable dyestuff forming substance 1,5-diaminonaphthalene-N,N'-diglucoside.

References Cited in the file of this patent

UNITED STATES PATENTS

| | | |
|---|---|---|
| 2,106,382 | Schmidt | Jan. 25, 1938 |
| 2,354,846 | Weygrand | Aug. 1, 1944 |
| 2,721,211 | Buc | Oct. 18, 1955 |

FOREIGN PATENTS

| | | |
|---|---|---|
| 183,868 | Great Britain | July 27, 1922 |
| 697,252 | Great Britain | Sept. 16, 1953 |